United States Patent Office.

FRANCIS ELLERSHAUSEN, OF LONDON, ENGLAND, ASSIGNOR TO THE SULPHIDES REDUCTION, (NEW PROCESS,) LIMITED, OF LONDON, ENGLAND.

TREATMENT OF COMPLEX AND REFRACTORY ORES.

SPECIFICATION forming part of Letters Patent No. 700,311, dated May 20, 1902.

Application filed February 15, 1900. Serial No. 5,318. (No specimens.)

*To all whom it may concern:*

Be it known that I, FRANCIS ELLERSHAUSEN, gentleman, of Broad Street House, New Broad street, in the city of London, England, have invented Improvements in the Treatment of Complex and Refractory Ores, of which the following is a specification.

This invention relates to the extraction of metallic lead and silver and compounds of zinc from complex and refractory ores containing the same; and it comprises the improvements hereinafter described.

According to my invention I smelt the raw ores in a blast-furnace in the same manner as ordinary oxidized ore is smelted, except that as far as possible I use more lime as flux than usually is the case, so as to leave as little zinc as possible in the slag, and I treat the fumes and gases so as to obtain them in a chemical and mechanical combination, which allows of an easy and economical separation of the metallic lead and silver from the compounds of zinc, as hereinafter described. Such sulfid ores as contain a larger proportion of zinc sulfid than that of lead are preferable for treatment by my process, because this excess favors not only the complete volatilization of the lead, but also furnishes a larger amount of sulfurous acid, the element needed in chemical combination with the fumes for the purpose of obtaining the separation of the metallic lead from the zinc, as explained hereinafter. In any case it is advisable to smelt sulfid ores with hot blast, as this causes a more rapid and complete oxidation of the sulfur than when smelted with cold blast. However much sulfur may be contained in the ore and sulfurous acid produced with the fumes of lead and zinc, no economical separation of metallic lead from the zinc can be effected if the said fumes are allowed to condense and collect in the so-called "dust-chambers" and most of the sulfurous acid to escape through the chimney. To obtain the chemical combination, the fumes and gases must be beaten and churned with water under high pressure, so as to be condensed and mixed with the water. To accomplish this, I place a fan or exhauster at the throat of the furnace, the wheel of which fan should have a diameter of, say, not less than five feet, the blades of which should consist of copper or other substance which will not corrode, and the speed of which should not be less than five hundred revolutions per minute. The water is fed into the fan-casing. The power for this fan must be considerably greater than that for the fan which produces the blast, because it not only has to churn the fumes and gases under a heavy pressure of water in its interior, but also has to withdraw the fumes and gases from the cupola in which the ore under treatment is smelted while a continuous stream of water is forced into it. If one fan is found insufficient to withdraw and condense all the fumes, two or a series of equal power and speed may be employed, working one behind another, so as to rechurn any escaping fumes and gases with additional water, while the water from the first fan or fans and containing condensed fumes is allowed to flow away into settling-tanks, in which the lead, silver, and certain zinc compounds are precipitated. Part of the zinc, however, is soluble in the water, it being sulfate and acid sulfite. The liquor remaining after the precipitation in the settling-tanks is forced back into the fan or fans to churn with fresh fumes, and so on until the liquor has reached the point of saturation. The liquor should, however, not be allowed to reënter the fan while it is hot, as this would generate steam, which would carry away fumes mechanically and also sulfurous acid, which is wanted to combine with the fumes. To prevent this, the settling-tanks must be of considerable area, so that the zinc liquor before it reënters the fan should have resumed its normal temperature. Under any circumstances two or more sets of tanks are required not only for cooling the liquor, but so that while one is in use for collecting the fumes and liquor the other can be cleaned out for further treatment. In case all the silver is not volatilized, and consequently not found in the precipitate, it will be found in the matte, together with any gold and copper, if such are in the ore.

In order to obtain the metallic lead and silver, as well as the compounds of zinc, from the precipitate and also the zinc from the tank liquor as merchantable products, I fuse the dried sludge with a molten crude caustic alkali, whereby metallic lead is deposited, and the secondary sludge—that is to say, the mass remaining after this reaction—is treated to separate the zinc and recover the alkali. In carrying this part of my invention into practice I advantageously proceed as follows—that is to say, the precipitated fumes or sludge, consisting of oxids, sulfate, and sulfite of lead, as well as these compounds and the sulfite of zinc, are spread out on a drying-floor and slowly dried. Alongside of this drying-floor several cast-iron pots of a shape and size such as are used in the manufacture of caustic soda or of cane-sugar are placed, provided with fireplaces underneath. Next to the pots stands a large tank, preferably large enough to contain at least thirty tons of black ash, from which carbonate of sodium is obtained in solution by lixiviation, and I mix the same with burnt lime. I have found that the mixing and subsequent lixiviation of the mass is most suitably and economically effected by putting a layer of black ash into the tank and on top of it a layer of burnt lime, and so continuing until the tank is filled up, say, to a height of from three to four feet. Water is then allowed to filter through this mass, whereby a crude caustic alkali liquor, which consists of sodium hydrate and sodium carbonate in varying proportions, together with sodium sulfite, sodium sulfate, &c., as impurities, is obtained and is led into the pots mentioned above. The liquor is then heated to the boiling-point and evaporated until the water is driven off, leaving the crude caustic alkali in a fused condition. The dried precipitate (the previous sludge) is added to the molten crude caustic alkali in small charges (say of twenty pounds each) at intervals of about one minute, and the whole mass is fused together. Each charge causes such an effervescence that the mass would overflow the pot if charged more quickly than mentioned above. As soon as about three times the amount of the dried sludge to the weight of caustic soda contained in the molten crude caustic alkali has been charged and no further effervescence takes place the contents of the pot are discharged in any convenient manner. The whole of the lead contained in the sludge will be found deposited at the bottom in a metallic form, while the insoluble compounds of zinc (principally sulfid of zinc) are held in suspension in the molten crude caustic alkali. This molten mass may be run into water to dissolve the caustic soda and at the same time precipitate the sulfid of zinc, or the mixture of caustic soda and zinc may be allowed to cool and may then be lixiviated to obtain the zinc. The solution of the caustic soda regained can be used for precipitating the zinc contained in the tank liquor, the caustic soda being converted into a solution of sulfate of sodium, which after being dried by the waste heat of the blast-furnace is available again for making black ash. The refuse from the lixiviating-tank is used after being dried as flux for smelting the sulfid ores in the cupola furnace.

The reactions which take place in treating the sludge with the molten crude caustic alkali may be expressed theoretically by the following formulæ: The caustic soda present probably converts the lead sulfite into hydrate with the formation of sodium sulfite.

$$PbSO_3 + 2NaHO = 2Pb(OH)_2 + Na_2SO_3.$$

The crude caustic alkali which is used in the unpurified condition always contains some sodium sulfid, and such sodium sulfid existing in the crude caustic alkali would immediately convert the lead hydrate into PbS and NaOH would be formed, $$Pb(OH)_2 + Na_2S = 2NaOH + PbS.$$

As soon as PbS is formed it is decomposed by the caustic soda and sodium carbonate with the production of metallic lead. Only part of the lead, however, is at this stage reduced, as some of the PbS forms a double sulfid with $Na_2S$. The following equations express the reactions:

$$7PbS + 4Na_2CO_3 = Na_2SO_4 + 3(Na_2S, PbS) + 4CO_2 + 4Pb$$

$$7PbS + 8NaOH = Na_2SO_4 + 3(Na_2S, PbS) + 4H_2O + 4Pb.$$

The second change is the reduction of the PbS by PbO, the latter formed by the NaOH or the oxidation of PbS, thus:

$$PbS + 2PbO = Pb_3 + SO_2.$$

Some of the PbS might react on the sodium sulfate previously formed with the following reaction:

$$2PbS + Na_2SO_4 = Na_2S + 2SO_2 + 2Pb.$$

What I claim, and desire to secure by Letters Patent, is—

1. The process of treating complex and refractory ores containing lead, silver and zinc, which consists in smelting the raw ores, positively drawing off the fumes and gases, and churning them with water to condense and mix them therewith, settling out the lead, silver and part of the zinc compounds from the resulting liquor, as a sludge, separating and drying the sludge, mixing black ash with burnt lime and passing water therethrough and evaporating the resulting liquid to obtain a molten crude caustic alkali, fusing the dried sludge, with said molten crude caustic alkali, thereby precipitating the lead in metallic form, separating the lead and treating the residual molten mass with water to dissolve out the caustic soda and precipitate sulfid of zinc, treating the liquid from which the sludge was separated and which contains zinc sulfate with the caustic soda thereby precipitating the zinc and converting the caustic soda into sulfate of sodium, and recovering the sulfate of sodium, substantially as described.

2. The process of treating complex and refractory ores containing lead, silver and zinc, which consists in smelting the raw ores, drawing off the fumes and gases and churning them with water to condense and mix them therewith, settling out the lead, silver and part of the zinc compounds, from the resulting liquor, as a sludge, separating and drying the sludge, fusing the sludge with impure caustic alkali containing sulfids, thereby precipitating the lead in metallic form, separating the lead, treating the residual molten mass to recover zinc, and treating the liquor from which the sludge was separated to recover zinc, substantially as described.

3. The process of treating complex and refractory ores containing lead, silver and zinc, which consists in smelting the raw ores, churning the fumes and gases with water to condense and mix them therewith, settling out the lead, silver and part of the zinc compounds from the resulting liquor as a sludge, separating and drying the sludge, fusing the dried sludge with impure caustic alkali containing sulfids, thereby precipitating the lead in metallic form, separating the lead, treating the residual molten mass to recover caustic soda and zinc compounds, treating the liquor from which the sludge was separated with said caustic soda, thereby precipitating zinc, and converting the caustic soda into sodium sulfate, and recovering the sodium sulfate, substantially as described.

4. The process of treating complex and refractory ores containing lead, silver and zinc, which consists in smelting the raw ores, churning the fumes and gases with water to condense and mix them therewith, settling out the lead, silver and part of the zinc compounds, from the resulting liquor as a sludge, separating and drying the sludge and fusing the dried sludge with impure caustic alkali containing sulfids, thereby precipitating the lead in metallic form, substantially as described.

5. The process of treating complex and refractory ores containing lead, silver and zinc, which consists in smelting the raw ores, churning the fumes and gases with water to condense and mix them with water, settling out the lead, silver and part of the zinc compounds from the resulting liquor as a sludge, separating and drying the sludge, fusing the dried sludge with caustic alkali, thereby precipitating the lead in metallic form, treating the molten residue after separation of the lead, to recover caustic soda and zinc sulfid and treating the liquor from which the sludge was separated, with said caustic soda, to deposit zinc, substantially as described.

6. The process of treating complex and refractory ores containing lead, silver and zinc, which consists in smelting the raw ores, churning the fumes and gases with water to condense and mix them with water, settling out the lead, silver and part of the zinc compounds from the resulting liquor, as a sludge, separating and drying the sludge, fusing the dried sludge with caustic alkali thereby precipitating the lead in metallic form, and treating the molten residue after the separation of the lead to recover caustic soda and zinc sulfid, substantially as described.

7. The process of treating complex and refractory ores containing lead, silver and zinc, which consists in smelting the raw ores, churning the fumes and gases with water to condense and mix them with water, settling out the lead, silver and part of the zinc compounds from the resulting liquor, as a sludge, separating and drying the sludge and fusing the sludge with caustic alkali thereby precipitating the lead in metallic form, substantially as described.

In testimony whereof I have hereto set my hand and seal this 4th day of January, 1900.

FRANCIS ELLERSHAUSEN. [L. S.]

Witnesses:
JOHN E. BOUSFIELD,
A. ALBUTT.